(12) United States Patent
Liu et al.

(10) Patent No.: US 9,982,668 B2
(45) Date of Patent: May 29, 2018

(54) OIL PUMPING APPARATUS

(71) Applicants: Yanan Liu, Perrysburg, OH (US);
Dawei Wang, Perrysburg, OH (US)

(72) Inventors: Yanan Liu, Perrysburg, OH (US);
Dawei Wang, Perrysburg, OH (US)

( * ) Notice: Subject to any disclaimer, the term of this patent is extended or adjusted under 35 U.S.C. 154(b) by 0 days. days.

(21) Appl. No.: 15/239,065

(22) Filed: Aug. 17, 2016

(65) Prior Publication Data

US 2018/0051688 A1 Feb. 22, 2018

(51) Int. Cl.
| F04D 15/00 | (2006.01) |
| F04B 47/02 | (2006.01) |
| E21B 43/12 | (2006.01) |
| F04B 49/06 | (2006.01) |
| F16H 19/06 | (2006.01) |

(52) U.S. Cl.
CPC .......... *F04B 47/026* (2013.01); *E21B 43/121* (2013.01); *F04B 49/065* (2013.01); *F16H 19/06* (2013.01)

(58) Field of Classification Search
CPC ................................ E02B 15/104; H02P 6/08
See application file for complete search history.

(56) References Cited

U.S. PATENT DOCUMENTS

| 3,968,041 | A | * | 7/1976 | De Voss | B65G 51/01 |
| | | | | | 210/242.3 |
| 4,021,019 | A | | 5/1977 | Sanders | |
| 5,189,388 | A | * | 2/1993 | Mosley | E21B 41/0021 |
| | | | | | 340/309.7 |
| 2005/0099176 | A1 | | 5/2005 | Heimlicher et al. | |
| 2006/0204365 | A1 | * | 9/2006 | Bevan | E21B 47/0007 |
| | | | | | 417/18 |
| 2014/0109682 | A1 | | 4/2014 | Mupdende et al. | |
| 2016/0204719 | A1 | | 7/2016 | Lesanko et al. | |
| 2016/0222957 | A1 | | 8/2016 | Robison et al. | |

OTHER PUBLICATIONS

Korean Intellectual Property Office (ISA/KR), "International Search Report for PCT/US2017/046731", Korea, dated Nov. 23, 2017.

* cited by examiner

*Primary Examiner* — Karen Masih
(74) *Attorney, Agent, or Firm* — Dragon Sun Law Firm, P.C.; Jinggao Li, Esq.

(57) ABSTRACT

There is provided an oil pumping apparatus including: a connector; a first roller mounted on a first frame and being rotatable about a first axle, a load belt moveable over the first roller, having one end connected to the connector and having another end connected with a hanging frame; a second roller being mounted with the hanging frame and being rotatable about a second axle; a third roller being mounted on the first frame and being rotatable about a third axle; a driven belt being moveable over the second roller, the driven belt being fixed at one end, and having another end being connected with the third roller; a control system for the apparatus; and a motor.

19 Claims, 7 Drawing Sheets

OIL PUMPING APPARATUS

BACKGROUND OF THE DISCLOSURE

1. Field of the Disclosure

The present disclosure relates generally to an oil pumping apparatus. More particularly, the present disclosure relates to an apparatus to pump crude oil from an oil well.

2. Description of Related Art

In an oilfield production, a pumping unit is a very important production facility during an operation of extracting crude oil from an oil well. Usually, there are two types of pumping units: (1) a pumping unit with beam; and (2) a pumping without beam. Both types of pumping unit have a disadvantage that each of these two types of pumping units needs to have a counterweight to balance the weight of a heavy rod and a device connected with the heavy rod.

When a pumping unit has a counterweight, the pumping unit has a tall frame and complex structures. Consequently, the pumping unit with the counterweight is heavier than a pumping unit without the counterweight. Because of the large size and heavy weight, the pumping unit with the counterweight can occupy a large area. Thus, it is difficult to transport and install the pumping unit with the counterweight when there is only a limited space available. For example, a pumping unit with the counterweight in the current market cannot be utilized for oilfield production over a sea because of its size, heavy weight and space constraints. Offshore oil platform and artificial island at the sea usually do not have enough space for the pumping unit with the counterweight.

Accordingly, there is a need to have a pumping unit without a counterweight.

SUMMARY OF THE DISCLOSURE

The present disclosure provides an apparatus to pump crude oil from an oil well.

The present disclosure also provides such an oil pumping apparatus that comprises: a connector, a first roller mounted on a first frame and rotatable about a first axle, a load belt moveable over the first roller and connected to the connector and to a hanging frame, a second roller being mounted to the hanging frame and rotatable about a second axle that is parallel to the first axle, a third roller being mounted on the first frame and rotatable about a third axle that is parallel to the first axis, and a driven belt being moveable over the second roller, the driven belt being fixed at one end and having another end of the driven belt connected to the third roller.

The oil pumping apparatus further comprises a control system for the apparatus, and a motor. When the motor rotates in a first direction, the motor drives the third roller to collect the driven belt. When the motor rotates in a second direction, the motor drives the third roller to release the driven belt from the third roller.

The present disclosure still further provides such an oil pumping apparatus in which the hanging frame and the second roller are moveable vertically.

The present disclosure yet further provides such an oil pumping apparatus that further comprises a guide rail that guides the hanging frame with a wheel when the hanging frame and the second roller move vertically.

The present disclosure still yet further provides such an oil pumping apparatus having a first friction force between the first roller and the load belt that drives the first roller, and a second friction force between the second roller and the driven belt that drives the second roller, with the second friction force being half of the first friction force.

The present disclosure also provides such an oil pumping apparatus that further comprises a count sensor and a plurality of measurement blocks, in which the count sensor sends a signal to a programmable logic controller when one of the plurality of measurement blocks passes by the count sensor.

The present disclosure further provides such an oil pumping apparatus that further comprises a reference soft iron and a reference position switch. When the reference soft iron is in a closest position to the reference position switch, the reference position switch sets the closest position as a reference position and sends a signal to a programmable logic controller.

The present disclosure still further provides such an oil pumping apparatus that further comprises an energy feedback unit in which the energy feedback unit transfers mechanical energy of the oil pumping apparatus to an electrical energy and restores electrical energy to a power grid.

The present disclosure yet further provides such an oil pumping apparatus in which the control system further comprises a power-off brake to set the oil pumping apparatus to have either a braking status or a non-braking status.

BRIEF DESCRIPTION OF THE DRAWINGS

A component or a feature that is common to more than one drawing is indicated with the same reference number in each drawing.

DETAILED DESCRIPTION OF THE DISCLOSURE

Figure 1:
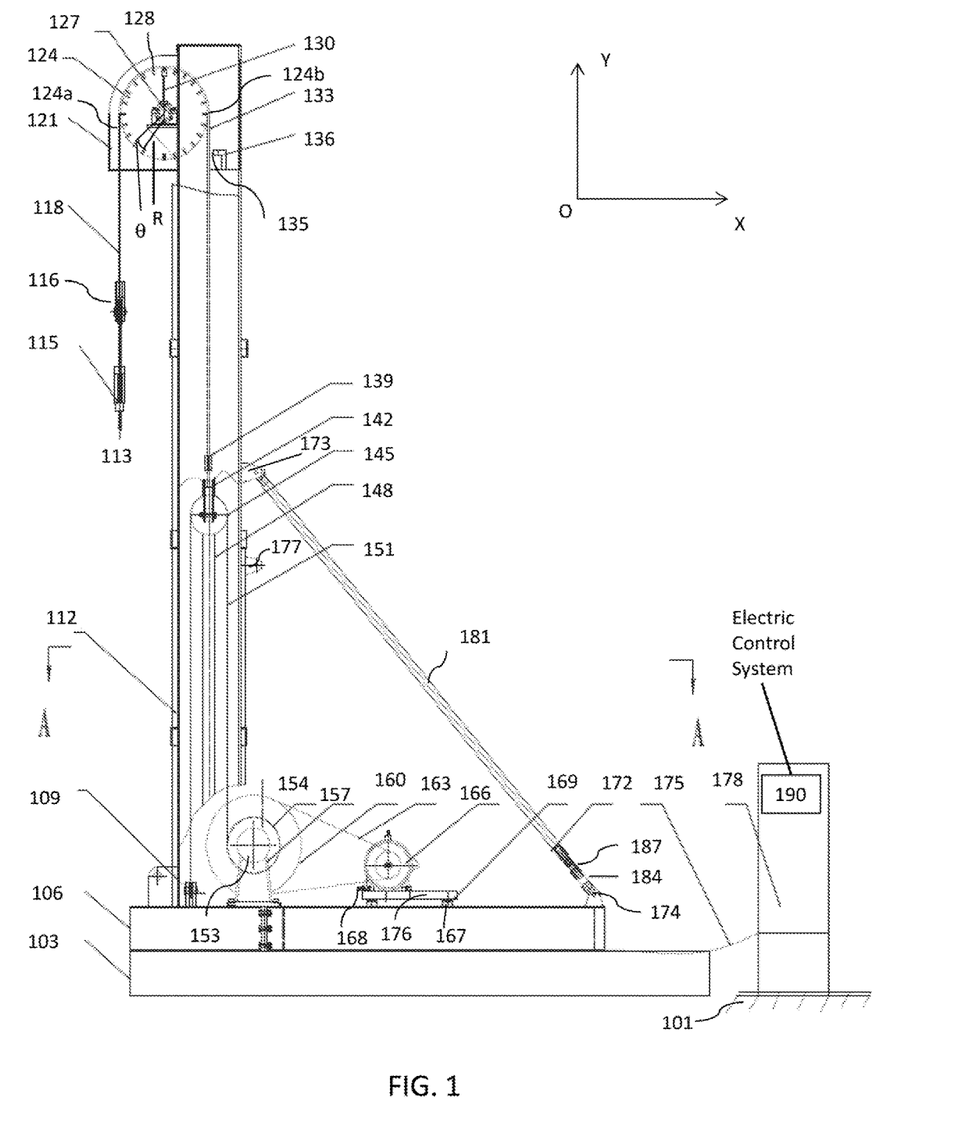
FIG. 1 is a side view of a pumping apparatus of the present disclosure.
Figure 2:
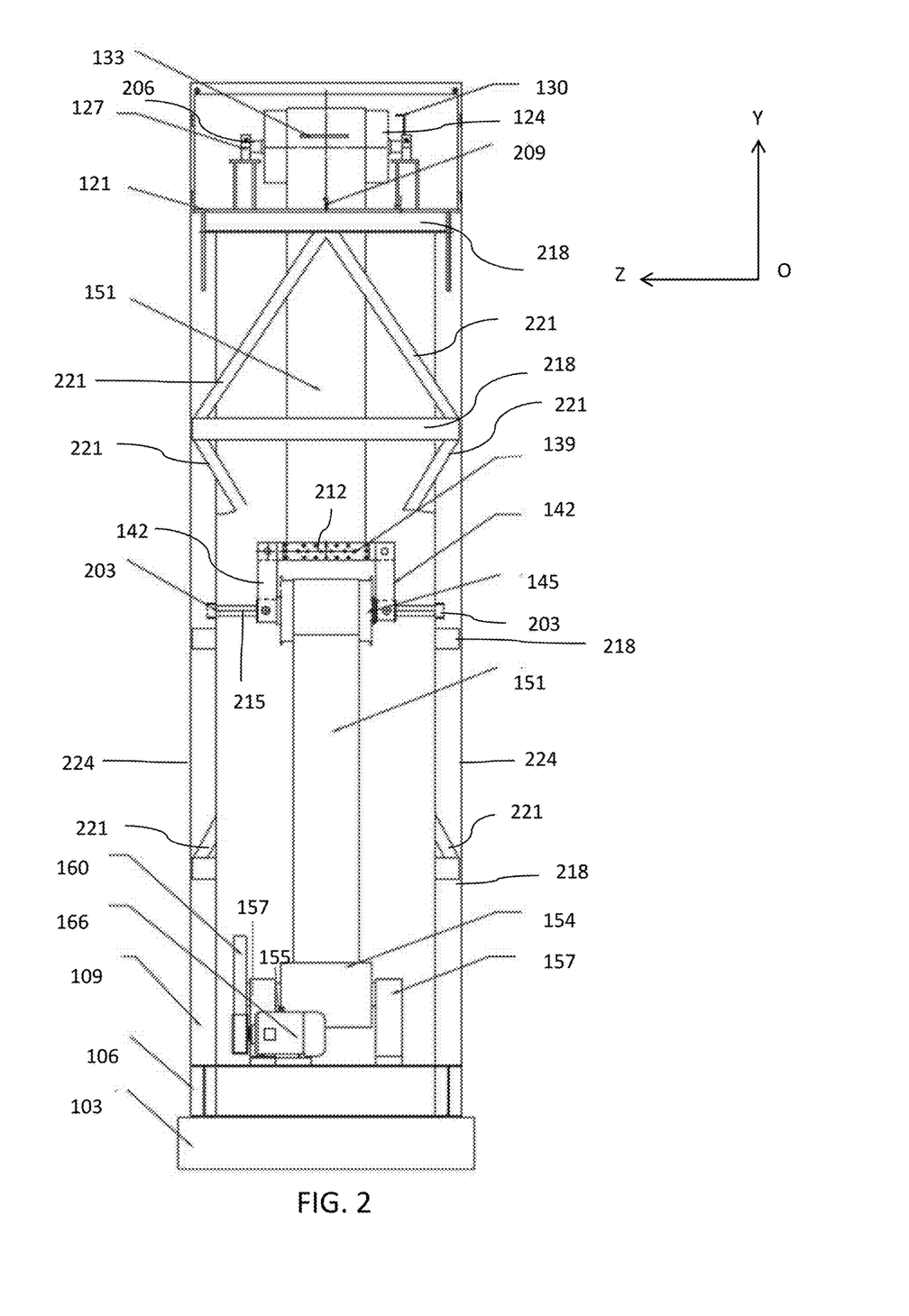
FIG. 2 is a front view of the pumping apparatus of FIG. 1.

Referring to the drawings and, in particular, to FIGS. 1 and 2, an exemplary embodiment of a pumping apparatus of the present disclosure is generally referred to by reference numeral 100. Apparatus 100 has a movable cement base 103, an apparatus base 106 mounted on cement base 103, and a fixed base 109 with a first frame 112 both connected to apparatus base 106. The apparatus 100 further has a first roller 124 connected to first frame 112, a load belt 118 that extends from first roller 124 to a second roller 145, a hanging frame 139 that includes two vertical plates 142 connected to second roller 145, a driven belt 151 that extends from second roller 145 to a third roller rotation axle 153 that is perpendicular to a X-Y plane, a third roller 154 for collecting and releasing driven belt 151 about third roller rotation axle 153 that is perpendicular to the X-Y plane. Apparatus 100 still further has a roller support frame 157 for supporting third roller 154, a roller wheel 160 connected to third roller rotation axle 153 and a connection belt 163 that drives roller wheel 160 by a motor 166. Apparatus 100 yet further has an energy feedback unit 606 (shown in FIG. 6) that transfers mechanical energy to electrical energy in the power grid.

As shown in FIG. 2, hanging frame 139 further has horizontal plate 212 and a horizontal axle 215. Referring to FIG. 1, horizontal plate 212 is connected, for example, with bolts, to one end of the load belt 118 and to two vertical plates 142. Horizontal axle 215 is connected to vertical plates 142, for example, by bolts. Each end of horizontal axle 215 connects with a shaft wheel 203. Shaft wheel 203 can rotate along a first guide rail 148 (shown in FIG. 1). First guide rail 148 guides the movement of hanging frame 139 and second roller 145 when hanging frame 139 and second roller 145 move up or down vertically. In one embodiment, first guide rail 148 has two sets of grooves on first frame 112, and each set of grooves guides the movement of each shaft wheel 203.

When hanging frame 139 and second roller 145 move down, a connector 115 can pull up a device 113. Similarly, when hanging frame 139 and second roller 145 move up vertically, connector 115 moves down vertically. Second roller 145 is also rotatable about horizontal axle 215 besides the movement in a vertical direction.

Second roller 145 carries the movement of driven belt 151 with a second friction force between driven belt 151 and second roller 145 while first roller 124 carries the movement of load belt 118 with a first friction force between first roller 124 and load belt 118. In one embodiment, the second friction force is only half of the first friction force.

Driven belt 151 is over second roller 145. One end of driven belt 151 connects with fixed base 109, and the other end of driven belt 151 is connected to third roller 154. Driven belt 151 can be either released from or collected by third roller 154. Ideally, there is no friction force between third roller 154 and driver belt 151.

Third roller 154 (including roller wheel 160), as shown in FIG. 2, is rotatable about roller axle 155. Roller axle 155 is mounted with apparatus base 106 through two roller support frames 157. Two roller support frames 157 further support connection belt 163 (FIG. 1) and roller axle 155 besides third roller 154.

First roller 124 has a roller axle 206 (shown in FIG. 2) that is parallel to a z-axis. First roller 124 is rotatable about roller axle 206. Mechanical bearings (not shown) can be installed between first roller 124 and roller axle 206 so that first roller 124 can be rotatable. Roller axle 206 is mounted with two roller support bases 127 (shown in FIG. 2). Roller support bases 127 are parts of first frame 112. Each roller support base 127 can be made of stainless steel.

First roller 124 has a device side 124a on a side of first roller 124 where device 113 connects to load belt 118, which is the left side of first roller 124 shown in FIG. 1. First roller 124 has a connection side 124b on a side of first roller 124 where load belt 118 connects to hanging frame 139, which is the right side of first roller 124 shown in FIG. 1.

First roller 124 carried the movement of load belt 118 by the first friction force between first roller 124 and load belt 118. First roller 124 changes the direction of the first friction force across load belt 118, and supports load belt 118. The direction of the first friction force across load belt 118 on the device side 124a is up while the direction of the first friction force across load belt 118 is down on the connection side 124b.

First roller 124 can be made of stainless steel. The diameter of first roller 124 is dependent on load requirements of connector 115. For example, when device 113 is heavy, first roller 124 has a larger diameter, and when device 113 is light, first roller 124 has a smaller diameter.

First roller 124 has a roller shield 121 connected to first frame 112, and a roller support base 127 connected to first frame 112. Roller support base 127 supports first roller 124. First roller 124 has a plurality of measurement blocks 128 that are equally spaced around first roller 124.

Load belt 118 wraps around about 180 degrees of first roller 124 so that the first friction force across load belt 118 is in a first vertical direction (i.e., positive Y direction) on device side 124a of first roller 124 and the second friction force across load belt 118 is in a second vertical direction (i.e., negative Y direction), which is opposite to the first vertical direction, on connection side 124b of first roller 124. One end of load belt 118 is connected with a connecting plate 116. The other end of load belt 118 is connected with hanging frame 139.

Furthermore, apparatus 100 has a reference soft iron 133 that is inserted in load belt 118, a count sensor 130 connected to first frame 112, and a reference position switch 136 connected to first frame 112.

Count sensor 130 works with measurement blocks 128 to measure the movement of first roller 124 relative to roller support base 127, and further measure the movement of load belt 118.

Count sensor 130 is mounted with roller support base 127. Measurement blocks 128 are mounted on a side surface of first roller 124. The material of measurement blocks 128 is soft iron, carbon steel or even semiconductor. Preferably, the material of measurement blocks 128 is soft iron. Soft iron has a low content of carbon and is easily magnetized and demagnetized. Measurement blocks 128 are equally spaced on a circle of first roller 124 with a radius of R. Because count sensor 133 is mounted with roller support base 127 and roller support base 127 is fixed with first frame 112, when one measurement block 128 passes by count sensor 130, the count sensor will add "1" to a total number of measurement blocks that have passed by the count sensor. Since the measurement blocks 128 are equally spaced on a circle (not shown) with the radius of R, an angle between two adjacent measurements blocks is recorded as θ degrees. The total number of measurement blocks that have passed by count sensor 130 is recorded as n. The total rotating angles of first roller 124 is equal to n*θ. The total distance S that first roller 124 moves is equal to:

$$S = \pi * R * n * \theta / 180 \quad \text{Equation (1)}$$

The total distance S can also be calculated based on a rotating speed of load belt 118 multiplied by a time of rotating.

Figure 4:
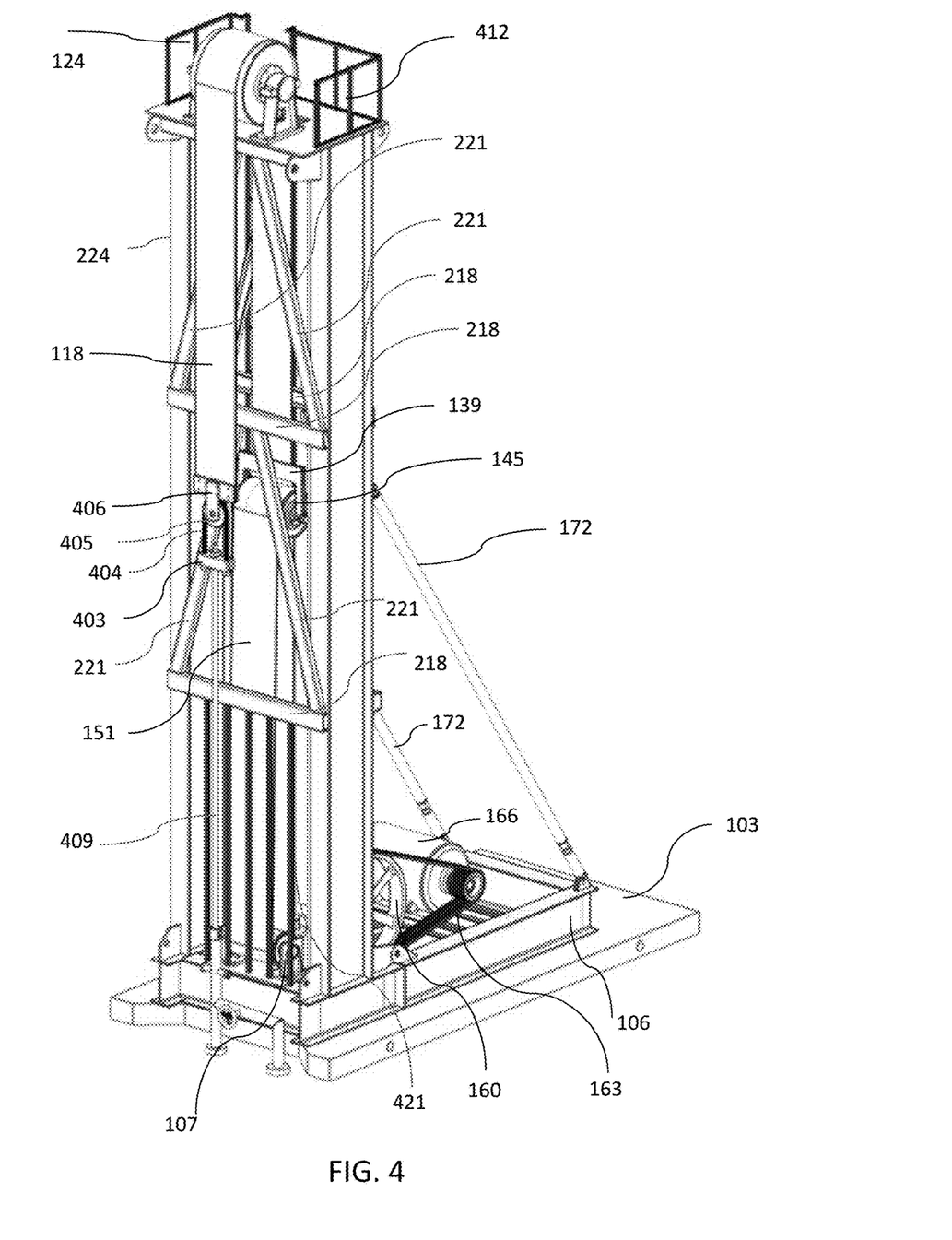
FIG. 4 is a front perspective view of the pumping apparatus of FIG. 1.

The information of the total distance S is transferred to a programmable logic controller (PLC) 627, as shown in FIG. 4, via wires 175.

Reference soft iron 133 (shown in FIG. 2) is inserted in a middle section of load belt 118. Reference position switch 136 is mounted with first frame 112. The material of the reference soft iron 133 can soft iron, carbon steel or even semiconductor material. Preferably, the material of reference soft iron 133 is soft iron. Soft iron has a low content of carbon and is easily magnetized and demagnetized.

Reference soft iron 133 works with reference position switch 136 to record a zero reference position 135 of load belt 118. When reference soft iron 133 moves to a closest position to reference position switch 136, reference position switch 136 sends a pulse signal to PLC 627. PLC 627 sets the closest position as zero reference position 135. After load belt 118 passes zero reference position 135, first roller 124 keeps rotating, any distance that the first roller rotates is recorded as a negative distance. When the negative distance reaches a lower pre-determined threshold set by PLC 627, PLC 627 sends a command to a motor controller 603 (shown in FIG. 6) that changes phases of input currents so that motor 166 can operate in a reverse direction. In FIG. 1, when first roller 124 rotates in a clockwise direction, motor 166 rotates in an anticlockwise direction.

Similarly, when first roller 124 rotates in an anticlockwise direction, second roller 145 also rotates in the anticlockwise direction, which is driven by a friction force between driven belt 151 and second roller 145. Second roller 145 also moves vertically up since the second roller is directly connected with load belt 118. As reference soft iron 133 moves to a closest position to reference position switch 136, the reference position switch sends another pulse signal to PLC 627. PLC 627 sets this closest position again as zero reference position 135. Any distance after reference soft iron 133 passes by zero reference position will be recorded as a positive distance. When the positive distance reaches an upper predetermined threshold set by PLC 627, PLC 627 sends another command to motor controller 603 to change phases of input currents for motor 166 so that the motor operates in another reverse direction, that is, rotates in a clockwise direction.

Furthermore, apparatus 100 has a second guide rail 169 that supports motor 166 and adjusts the position of motor 166, a support rod 172 to support first frame 112, a plurality of wires 175 connected to an electric control cabin 178 for signal communications. Electrical control cabin 178 cabin has an electric control system 190. The control system 190 includes a PLC, a few switches and a series of cables/wires connected with the PLC and the switches.

Motor 166 drives roller wheel 160 through connection belt 163 to rotate roller wheel 160. Roller wheel 160 is connected to roller axle 155 so that rotation of the roller wheel rotates third roller 154 via the roller axle.

Referring to FIG. 1, motor 166 together with second guide rail 169 is located on top of a motor base 176. The position of motor 166 can be adjusted through second guide rail 169 so that motor can drive third roller 154 properly. More specifically, the position of motor 166 can be adjusted horizontally via bolts 168 and be adjusted vertically via footpads 167.

Motor 166 is controlled by an electric control cabinet 178 via wires 175. Electronic control cabinet 178 has the automatic control system 190.

Figure 6:
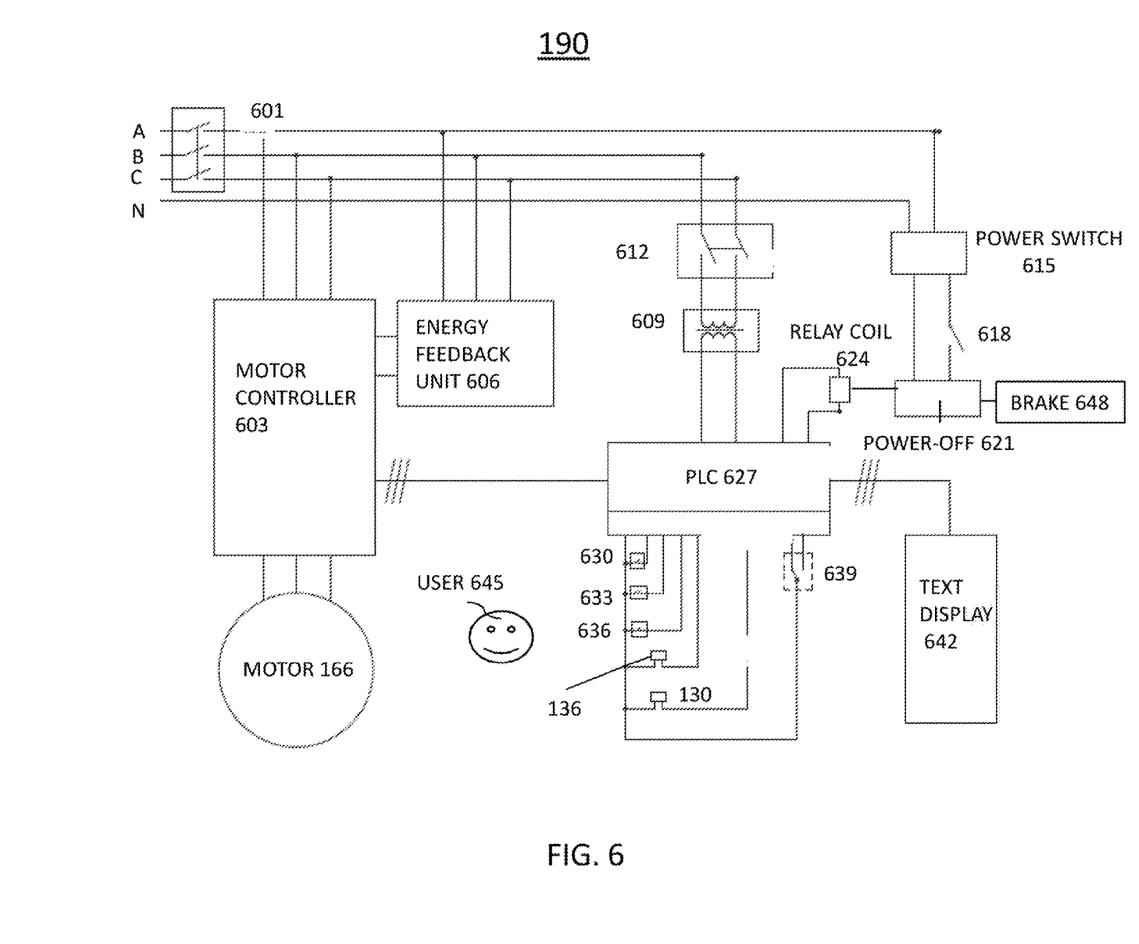
FIG. 6 is a block diagram of an electronic control system of the pumping apparatus of FIG. 1.

Apparatus 100 has an energy feedback unit 606 shown in FIG. 6. Energy feedback unit 606 is to restore the renewable energy to the power grid. More specifically, energy feedback unit 606 converts the kinetic and potential energy of apparatus 100 to an electrical power, and the electrical power can be transferred to the power grid, saving the energy effectively. When connector 115 moves down, the moving speed of connector 115 is faster than an expected speed that motor 166 provides, because the gravity force of connector 115 and device 113 that is connected to the connector accelerates the speed of the connector. The additional speed of connector 115 will in turn cause motor to generate electricity. Electric power from electricity can be converted from mechanical to electrical energy by energy feedback unit 606, and then the electrical energy will be transferred to the power grid.

Energy feedback unit 606 can be called as Active Front End (AFE). AFE is a well-known technology device/solution for energy generation.

The below describes some other components of apparatus 100.

Cement base 103 is made of reinforced concrete. Cement base 103 can support a heavy load. In one embodiment of the present disclosure, cement base 103 can support a minimum load of 150 kilopascals ("kPa"). Most components of apparatus 100 are located on top of cement 103.

Apparatus base 106 supports all the weight of the other components of apparatus 100 except cement base 103 and an electric control cabin 178. Apparatus base 106 can be made of stainless steel.

Fixed base 109 is connected to apparatus base 106, for example, fixed base 109 is welded or bolted to the apparatus base. Fixed base 109 connects with one end of driven belt 151. In one embodiment, fixed base 109 has an ear-shaped structure.

First frame 112 is connected to apparatus base 106, preferably welded to apparatus base 106. First frame 112 is made of a material, for example, stainless steel. First frame 112 is preferably perpendicular to a ground 101. Alternatively, first frame 112 can have an angle greater than or less than 90 degrees with ground 101. A rod 172 supports first frame 112 through an upper hinge 173 and a lower hinge 174. Upper hinge 173 and lower hinge 174 prevent undesirable movement so that first frame 112 will not flip over. More specifically, lower hinge 174 is connected with a short rod 184. A middle rod 187 is connected with a long rod 181 and short rod 184. Middle rod 187 and long rod 181 can be connected with threads, and the middle rod and short rod 184 can also be connected with threads.

When it is desired for first frame 112 to have an angle greater than or less than 90 degrees with ground 101, one end of long rod is connected with a middle hinge 177 instead of upper hinge 173. The slope angles can be varied depending on operation requirements of apparatus 100.

Load belt 118 and driven belt 151 can be plied textile belting. Load belt 118 and driven belt 151 can have multiple layers that include a cover layer, a skim rubber layer and a textile layer. Width of load belt 118 and driven belt 151 vary with load requirements of connector 115, and can be in a range of 450 millimeter ("mm") to 600 mm.

Roller shield 121 protects first roller 124 even in inclement weather. Roller shield 121 is located outside of first roller 124 and is mounted with first frame 112. Roller shield 121 can be made of stainless steel.

Connector 115 connects connecting plate 116 with a device 113. More specifically, one end of connector 115 is connected with device 113 that will be pulled by load belt 118, and the other end of connector 115 is connected with one end of connecting plate 116. In one embodiment, connector 115 can be a standard component for oil pumping devices. In one embodiment, connecting plate 116 is made of stainless steel.

Device 113 can be an oil container or any devices for pumping crude oil. Device 113 can be two or more devices that are in serial or parallel connections to connect with connector 115.

First frame 112 has a plurality of vertical beams 421, as shown in FIG. 4, a plurality of horizontal beams 218, a plurality of triangular beams 221, and a plurality of side plates 224. The above-mentioned plurality of vertical bar, horizontal bars, triangular bars and side plates are connected together, for example, by bolts or welded. First frame 112 has a triangular bottom (not shown) resting on top of apparatus base 106 so that first frame 112 maintains good stability for apparatus 100.

Figure 3:
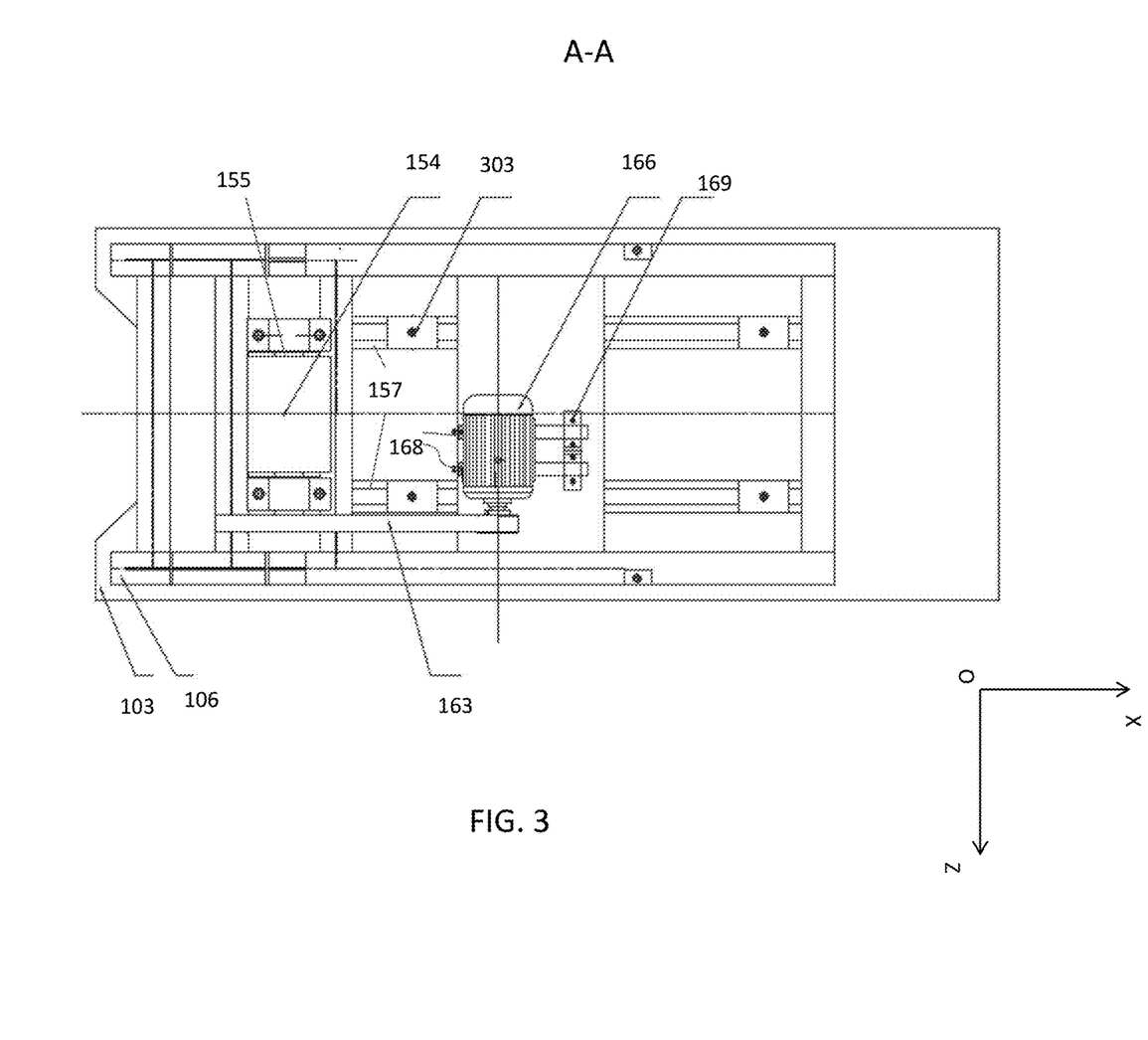
FIG. 3 is a sectional view of the pumping apparatus taken along A-A of FIG. 1.

Referring to FIG. 3, third roller 154 can be rotatable about roller axle 155. The position of motor 166 relative to third roller 154 can be adjusted through bolts 168 and footpads 167. Two support frames 157 are mounted on top of base 106 with anchor bolts 303.

FIG. 4 shows an embodiment of the present disclosure that has a connector 403 and a connecting plate 406. Connector 403 connects with a rod 409, and can push or pull rod 409 through the movement of load belt 118.

Connecting plate 406 is connected with one end of load belt 118 with bolts. Connecting plate 406 further has a wheel 405 and a u-shaped rod 404.

Apparatus 100 further has a platform 412. An operator 645, shown in FIG. 6, can climb to platform 412 through a ladder 509, as shown in FIG. 5.

Figure 5:
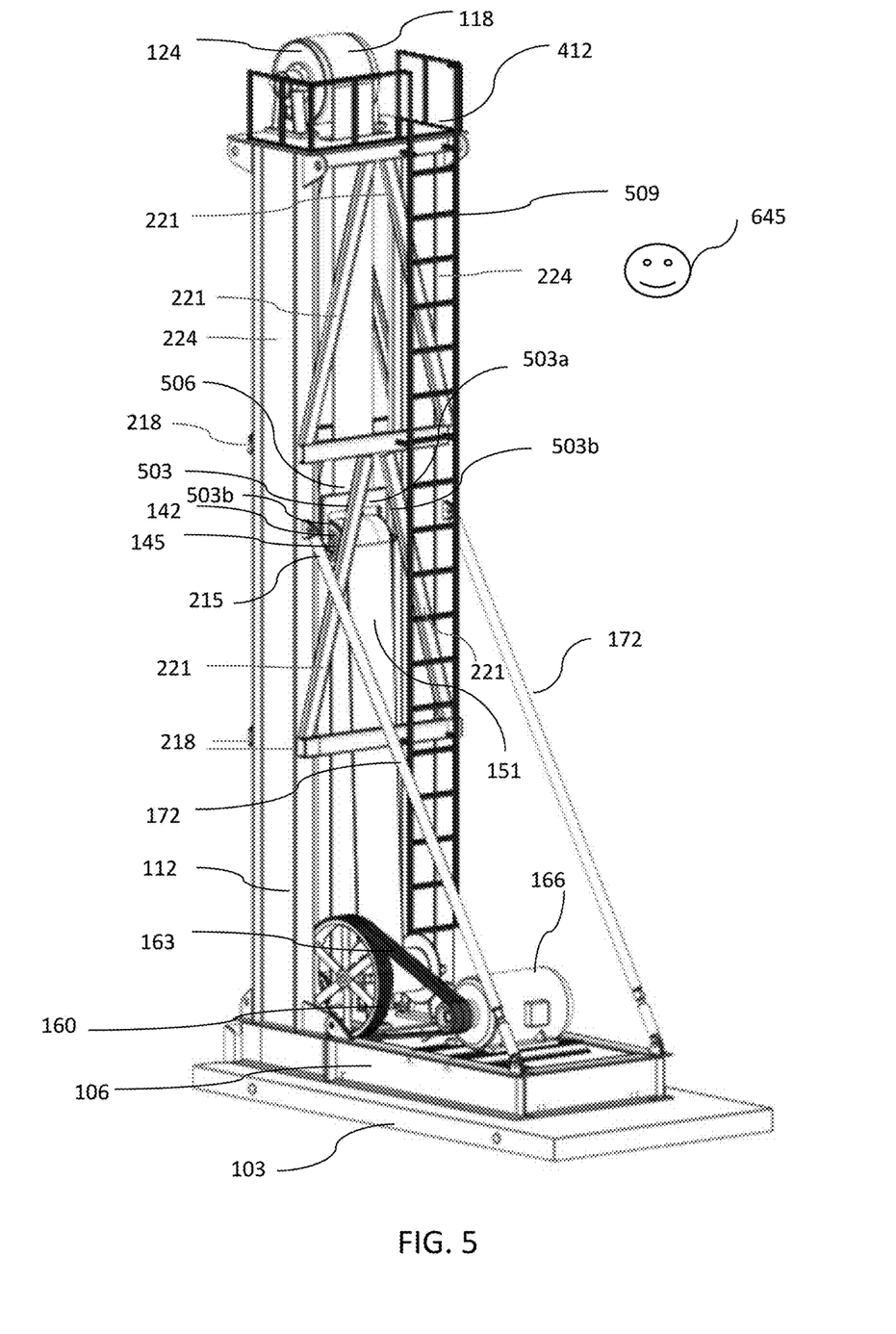
FIG. 5 is a back perspective view of the pumping apparatus of FIG. 1.

FIG. 5 shows a hanging frame 503 different from hanging frame 139. Hanging frame 503 has a horizontal portion 503a, and two vertical portions 503b. Hanging frame 503 has a single plate 506 as a hanging frame and horizontal axle 215 connected to second roller 145.

Referring to FIG. 6, electronic control system 190 of apparatus 100 has a power switch 601 to supply power of apparatus 100, motor controller 603 that controls the operation of motor 166, energy feedback unit 606, a transformer 609, a transformer switch 612, a power switch 615, a normal open relay switch 618, a power-off brake 621 that has a brake 648, a relay coil for brake control 624, PLC 627, an upwards start button 630, a downwards start button 633, a stop button 636, reference position switch 136, count sensor 130, a manual/automatic switch 639, and a text display 642

Power switch 601 provides power for apparatus 100. The power has three phase inputs A, B, C and a grounded phase N. Motor controller 603 and energy feedback unit 606 have three-phase inputs. Transformer switch 612 and transformer 609, and PLC 627 have phases B and C as inputs. Power-off brake 621 has phase A and grounded phase N as power inputs.

Figure 7:
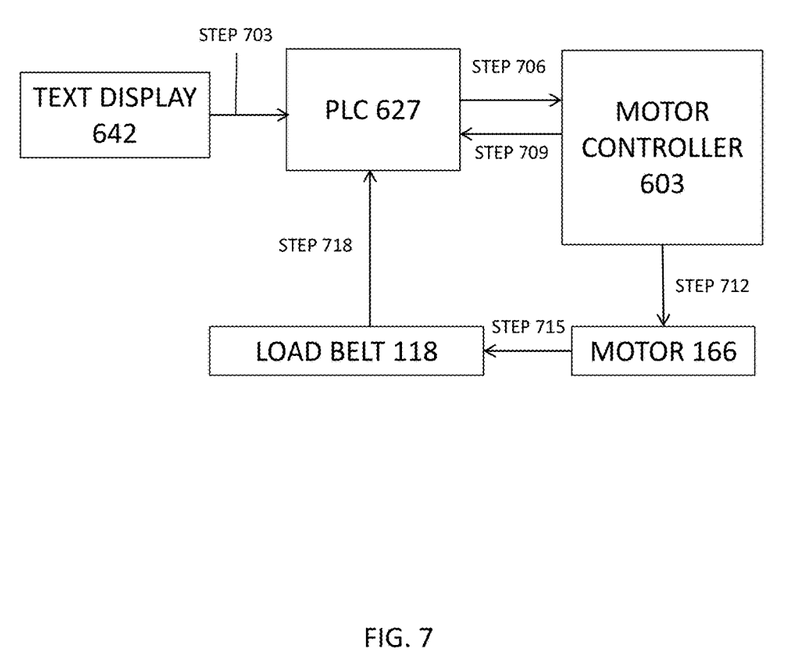
FIG. 7 is a diagram of signal communication among the electronic control system of FIG. 6.

Motor controller 603 provides real-time operation statuses of motor 166 to PLC 627 through a process 709 as shown in FIG. 7. Motor controller 603 controls start, stop, rotation speed and rotation direction of motor 166.

Transformer switch 612 provides power for transformer 609. Transformer 609 provides power for PLC 627.

Power switch 615 and normal open relay switch 618 provide power for power-off brake 621.

Normal open relay switch 618 is open as a default position. PLC 627 controls an on or off state of power-off brake 621 through normal open relay switch 618. More specifically, when PLC 627 indicates an on state for power-off brake 621 normal open relay switch 618 is closed and power-off brake 621 has power to turn brake 648 off. When PLC 627 indicates an off state for power-off brake 621, normal open relay switch 618 is open, power-off brake 621 has no power and brake 648 is on.

Relay coil for brake control 624 is controlled by PLC 627. Relay coil for brake control 624 controls the status of normal open relay switch 618. When relay coil for brake control 624 has power, it can create a magnetic field. The magnetic field creates an electromagnetic attraction force to open or close relay switch 618. Specifically, when relay coil for brake control 624 has power, normal open relay switch 618 is closed. When normal open relay switch 618 has power and is closed, power-off brake 621 has power, and brake 648 of the power-off brake 621 is off. When brake 648 is off, motor 166 operates. When no power is provided to relay coil for brake control 624, normal open relay switch 618 is open, and motor 166 cannot operate.

PLC 627 controls motor controller 603 to operate motor 166. Motor controller 603 outputs status of motor 166 to PLC 627. PLC 627 further commands an on/off state for power-off brake 621, operation of upwards, downwards, start, stop, stroke adjustment, stroke frequency adjustment, brake stop and any other functions of apparatus 100 through a process 706. PLC 627 is the controller for apparatus 100. PLC 627 receives operation instructions of motor 166 from text display 642 as inputs.

Upwards start button 630 controls operation of motor 166 to move connector 115 up. More specifically, when upwards start button 630 is pressed, PLC 627 provides output signals to command power-off brake 621 to turn off brake 648, and provides a command to operate motor 166 in a clockwise direction.

Downwards start button 633 controls the operation of motor 166 to move connector 115 downward. More specifically, when downwards start button 630 is pressed, PLC 627 provides output signals to command power-off brake 621 to turn off brake 648, and a command to operate motor 166 in an anticlockwise direction.

Stop button 636 stops operation of motor 166. Operator 645 can press stop button 636 to command PLC 627 to have a shutdown action. More specifically, when operator 645 presses stop button 636, it provides an input signal to PLC 627. PLC 627 provides output signals to command power-off brake 621 to turn off brake 648. At the same time, motor controller 603 controls motor 166 to stop the movement of connector 115. PLC 627 can extract and save a last stop position of load belt 118 to determine an initial desired direction of travel.

Count sensor 130 counts the number of measurement blocks 128. More specifically, count sensor 130 records the number of revolutions indicated by detecting movement of measurement blocks 128.

Reference position switch 136 receives a signal through induction and sends out pulse signals to PLC 627 when reference soft iron 133 reaches the location of reference position switch 136. PLC 627 records zero reference position 135 when reference soft iron 133 reaches the location of reference position switch 136.

Manual/automatic switch 639 changes the operation of apparatus 100 to be manual or automatic.

Text display 642 can set the operation parameters of apparatus 100. Operation parameters of motor 166, such as stroke and frequency, are provided or adjusted by text display 642. Text display 642 provides operation parameters of motor 166 as input signals to PLC 627. For example, text display 642 can adjust the maximum and the minimum stroke, operation speed and operation frequency of motor 166 when manual/automatic switch 639 is set to be automatic.

Referring to FIG. 7 during process 703, text display 642 can provide input signal to PLC 627 on the operation parameters of apparatus 100.

During process 706, PCL 627 commands motor controller 603 to control start-stop, rotation speeds and rotation directions of motor 166.

During step 709, motor controller 603 can provide input signals to PLC 627 to show the status of motor 166 on whether motor 166 is overloaded, the current of motor 166 is too high, or the voltage of motor 166 is too high or too low, and the like.

During step 712, motor controller 603 controls the start, stop and operation of motor 166.

During step 715, motor 166 provides power to drive the movement of load belt 118 indirectly.

During step 718, reference position switch 136 and count sensor 130 send location signals of load belts 118 to PLC 627 so that PLC 627 can control the operation of motor 166.

The below describes the operation of apparatus 100 to have a complete cycle of movement. To illustrate, the complete cycle is divided into four steps: (1) connector 115 moves up, and load belt 118 reaches a reference position; (2) connector 115 moves up, and load belt 118 reaches a negative pre-determined stroke; (3) connector 115 moves down, and load belt 118 moves back to zero reference position 135; and (4) connector 115 moves down, load belt 118 reaches a positive pre-determined stroke.

During step (1), connector 115 is located in the wellhead of an oil well. Power switch 601 is closed to supply power to electronic control cabinet 178. Operator 645 presses upwards start button 630, PLC 627 has an input signal to move connector 115 up. After a logical analysis, PLC 627 provides power to relay coil for brake control 624. When relay coil for brake control 624 has power, normal open relay switch 618 is closed, and provides power to power-off brake 621. Brake 648 of power-off brake 621 is off. Power-off brake 621 is in a non-braking status. PLC 627 and motor controller 603 send signals to provide power to motor 166 so that motor 166 can operate in an anticlockwise direction. More specifically, roller wheel 160 drives the third roller 154 to rotate in an anticlockwise direction so that a portion of driven belt 151 wraps or coils around third roller 154. Consequently, driven belt 151 pulls second roller 145 down. For example, when driven belt 151 goes down approximately 2 meters via second roller 145, load belt 118 on the right side of first roller 124, which is on connection side 124b, moves down about one meter.

Load belt 118 covers first roller 124, as shown in FIG. 1. Load from device 113 and tension of load belt 118 from driven belt 151 around third roller 154 cause a large friction force between load belt 118 and first roller 124. The friction force drives first roller 124 to rotate in a clockwise direction when roller wheel 160 rotates third roller 154 in an anticlockwise direction. Second roller 145 also rotates in the clockwise direction, which is driven by a friction force between driven belt 151 and second roller 145. Second roller 145 also moves vertically down as second roller 145 is directly connected with load belt 118.

When first roller 124 rotates, load belt 118 on connection side 124b of first roller 124 moves down, and reference soft iron 133 reaches the closest position to reference position switch 136. Reference position switch 136 sends a pulse signal to PLC 627 of electric control cabinet 179. PLC 627 then records this position as zero reference position 135.

During step (2), as first roller 124 continues to rotate, measurement block 128 rotates. After zero reference position 135, when a measurement block 128 passes by count sensor 130, count sensor 130 starts to add one to the total number of measurement blocks recorded by count sensor 130 and sends a pulse signal to PLC 627. PLC 627 records the number of pulse signals and calculates the displacement conversion in accordance with Equation (1). When reference soft iron 133 is located below zero reference position, the number of pulse signals sent by count sensor 130 is negative, and when reference soft iron 133 is located above zero reference position 135, the number of pulse signals sent by count sensor 130 is positive.

When the calculated distance S reaches a pre-determined threshold of stroke set by text display 642, PLC 627 sends a commutation signal to motor controller 603. Motor controller 603 outputs reversing power inputs to motor 166. As a result, motor 166 rotates reversely. More specifically, motor 166 rotates in a clockwise direction.

During step (3), when motor 166 rotates in a clockwise direction, third roller 154 rotates in a clockwise direction, and third roller 154 uncoils or releases driven belt 151. Because of heavy load of device 113, the gravity force of the device and connector 115 also pull load belt 118, second roller 145 and driven belt 151.

Motor 166 is pulled by the gravity force to rotate through connection belt 163. The gravity force of device 113 additionally accelerates the rotation speed of motor 166 from the speed without the impact of the gravity force. When motor 166 is accelerated, motor 166 generates electricity. This electric power from the electricity can be transferred to motor controller 603. Motor controller 603 rectifies the electricity from alternating current (AC) to direct current (DC). Motor controller 603 sends the rectified electricity to energy feedback unit 606. Energy feedback unit 606 rectifies the electricity from DC to AC to have a same phase and a same voltage with the power grid. Accordingly, the electric power can be restored back to the power grid.

When first roller 124 rotates, load belt 118 on connection side 124b of first roller 124 moves up, and reference soft iron 133 reaches the closest position to reference position switch 136. Reference position switch 136 sends a pulse signal to PLC 627 of electric control cabinet 179. PLC 627 then records the closest position as reference position 135.

During step (4), as motor 166 continues to rotate in the clockwise direction, device 113 moves down. The movement of load belt 118 connected with connector 115 is tracked by measurement blocks 128 and count sensor 130. Every time when a measurement block 128 passes by count sensor 130, the number of count sensor adds "1". Simultaneously, count sensor sends a pulse signal to PLC 627. PLC 627 records the number of pulse signals and calculates the displacement conversion in accordance with Equation (1).

When the calculated displacement reaches an upper pre-determined threshold of stroke set by text display 642, PLC 627 sends a signal to motor controller 603. Motor controller 603 sends reverse input currents to motor 166. As a result, motor 166 rotates reversely. More specifically, motor 166 rotates in an anticlockwise direction to pull connector 115 and device 113 up.

Step (1) of the cycle movement will start again.

After connector 115 and device 113 moves from up to down and then from down to up, a cycle movement of apparatus 100 is complete.

Apparatus 100 can have as many cycles of steps (1)-(4) as necessary to pull crude coil to ground 101. Apparatus 100 can be stopped at any time in the middle of a cycle movement. Crude oil is contained in device 113 or any other devices that is connected with device 113. Any other devices can be in parallel or in serial connection with device 113 as long as apparatus 100 can handle the operation requirements such as load requirements.

PLC 726 can control the direction of movement and stroke of device 113 instantaneously. PLC 627 can also save the real-time operation status of motor 166. When apparatus 100 is in an automatic operation mode, apparatus 100 can be restarted from a status when apparatus 100 is stopped.

Because reference soft iron 133 is installed inside load belt 118 and does not shift, a zero calibration when the reference soft iron passes reference switch 136 can maintain an accuracy of tracking the stroke of the load belt.

When operator 645 presses stop button 636 during any cycle movements, electric control cabinet 178 can save the status of apparatus 100 automatically, and PLC 627 will not supply power to motor 166 and power-off brake 621. Brake 642 of is on, and apparatus 100 is stopped.

The below description describes the details that apparatus 100 operates in a manual operation mode.

When apparatus 100 is in a manual operation mode, power switch 601 and transformer switch 612 are closed to supply power to electric control cabinet 178. Manual/automatic switch 639 is switched to a manual operation mode.

Operator 645 presses and holds upwards start button 630. PLC 627 provides power to relay coil for brake control 624. When relay coil for brake control 624 has power, normal open relay switch 618 is closed and provides power to power-off brake 621. Brake 648 of power-off brake 621 is off. Power-off brake 621 is in a non-braking status. PLC 627 and motor controller 603 send signals to provide power to motor 166 so that the motor can operate in an anticlockwise direction. Motor controller 603 controls motor 166 to rotate in a speed specified by text display 642. Roller wheel 160 drives third roller 154 to rotate in a counterclockwise direction. Consequently, driven belt 151 pulls second roller 145 down. Connector 115 and device 113 move up. When operator 645 releases upwards start button 630, PLC 627 sends a signal to motor controller 603 to stop motor 166, and normal open relay switch 618 is open and provides no power to power-off brake 621. Brake 648 of power-off brake 621 is on. Power-off brake 621 is in a braking status.

The manual operation process when operator 645 presses and holds upwards start button 630 is similar to a process when operator 645 presses and holds downward start button 633. The difference is that when operator 645 presses and holds downwards start button 633, motor 166 starts to rotate in a clockwise direction because connector 115 moves down.

The below description descries that apparatus 100 operates in an automatic operation mode.

Manual/automatic switch 639 is set to be an automatic mode. PLC 627 scans whether there is any fault in the memory of PLC 627. When there is a fault, PLC 627 can display the fault. PLC 627 will not start apparatus 100 unless all the faults are resolved. PLC 627 can determine the location of connector 115 either from the operation status when apparatus 100 was stopped, or from signals of reference position switch 136 and signals of count sensor 130. For example, if the number counted by count sensor is recorded as a positive number, it means that reference soft iron 133 is located above zero reference position 135. Zero reference position 135 is the position where reference soft iron 133 is in the closest position to reference position switch 136. Signals of count sensor 130 can tell the location of load belt 118 relative to reference position switch 136.

Once the location of connector 115 is determined, PLC 627 provides power to relay coil for brake control 624. When relay coil for brake control 624 has power, normal open relay switch 618 is closed and provides power to power-off brake 621. Brake 648 of power-off brake 621 is off, and the power-off brake is in a non-braking status. PLC 627 and motor controller 603 send signals to provide power to motor 166. Motor controller 603 controls motor 166 rotates in a speed specified by text display 642. It is assumed that from the location of connector 115, motor 166 will operate in an anticlockwise direction so that reference soft iron 133 can move down. As motor 166 rotates, count sensor 130 sends a signal to PLC 627 when one of measurement blocks 128 passes count sensor 130, PLC 627 records the number of pulse signals and calculates the displacement in accordance with Equation (1).

When the calculated displacement is close to the upper pre-determined threshold of stroke set by text display 642, motor 176 starts to decelerate the rotation speed gradually. Once the displacement reaches the upper pre-determined threshold of stroke, PLC 627 sends a signal to motor controller 603. Motor controller 603 changes the phases of input currents to motor 166. As a result, motor 166 rotates reversely, namely rotates in a clockwise direction.

When motor 166 rotates in the clockwise direction, reference soft iron 133 moves up. When reference soft iron 133 is in the closest position to reference position switch 136, a zero position is reset again. Count sensor 130 sends a signal to PLC 627 when a measurement block 128 passes by count sensor 130. PLC 627 records the number of pulse signals and calculates the displacement in accordance with Equation (1). After load belt 118 passes the zero reference position, and when the calculated displacement is close to the lower pre-determined threshold of stroke set by text display 642, motor 166 starts to decelerate the rotation speed of motor 166 gradually. Once the displacement reaches the lower pre-determined threshold of stroke, PLC 627 sends a signal to motor controller 603 to change the phases of input currents to motor 166. As a result, motor 166 rotates reversely, namely rotates in an anticlockwise direction again.

When the recorded number of measurement blocks 128 by count sensor 130 is negative, it means that reference soft iron 133 is located below zero reference position 135.

The operation parameters of motor 166 are set by text display 642. The parameters include, but are not limited to, a frequency of motor 166, the rotation speed of the motor and the upper and the lower pre-determined thresholds of displacement.

In one embodiment, motor 166 can be a permanent magnetic synchronic motor with a large torque.

In should be noted "anticlockwise" and "clockwise" are defined as if operator 145 views FIG. 1 of apparatus 100 from a front view.

It should be noted that "negative" and "positive" are relative terms with respect to zero reference position 135.

It should also be noted that the terms "first", "second", and the like can be used herein to modify various elements. These modifiers do not imply a spatial, sequential or hierarchical order to the modified elements unless specifically stated.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure will not be limited to the particular embodiment(s) disclosed as the best mode contemplated, but that the disclosure will include all embodiments falling within the scope of the appended claims.

What is claimed is:

1. An oil pumping apparatus comprising:
   a connector;
   a first roller mounted on a first frame having a first axle, the first roller being rotatable about the first axle;
   a load belt moveable over the first roller, the load belt having one end connected to the connector, and having another end connected with a hanging frame;
   a second roller being mounted with the hanging frame, and being rotatable about a second axle;
   a third roller being mounted on the first frame, and being rotatable about a third axle;
   a driven belt being moveable over the second roller, the driven belt being fixed at one end, and having another end connected with the third roller;
   a control system for the apparatus;
   a motor,
   wherein when the motor rotates in a first direction, the motor drives the third roller to collect the driven belt, and
   wherein when the motor rotates in a second direction, the motor drives the third roller to release the driven belt from the third roller, and
   an energy feedback unit,
   wherein the energy feedback unit transfers mechanical energy of the oil pumping apparatus to an electrical energy and restores electrical energy to a power grid.

2. The oil pumping apparatus of claim 1, where the hanging frame and the second roller are moveable vertically.

3. The oil pumping apparatus of claim 2, further comprising a guide rail that guides the hanging frame with a wheel when the hanging frame and the second roller move vertically.

4. The oil pumping apparatus of claim 1, wherein between the first roller and the load belt there is a first friction force that drives the first roller, and between the second roller and the driven belt there is a second friction force that drives the second roller, the second friction force being half of the first friction force.

5. The oil pumping apparatus of claim 1, further comprising an automatic mode and a manual operation mode.

6. The oil pumping apparatus of claim 1, wherein the motor is a permanent magnetic synchronic motor.

7. The oil pumping apparatus of claim 1, the control system further comprising:
   a programmable logic controller (PLC) disposed in an electrical control cabin,
   a motor controller connected to both the PLC and the motor, and
   a text display directly connected to the PLC.

8. The oil pumping apparatus of claim 7, wherein the PLC controls the motor controller and provides power to a relay coil for brake and a normal open relay switch.

9. The oil pumping apparatus of claim 8, wherein the control system further comprises a power-off brake,
   wherein the relay coil for brake and the normal open relay switch control the operation of the power-off brake, and
   wherein the power-off brake can set the oil pumping apparatus to have either a braking or a non-braking status.

10. The oil pumping apparatus of claim 7, wherein the motor controller controls start, stop, rotation speeds, and rotation directions of the motor, and provides real-time status of the motor to the PLC.

11. The oil pumping apparatus of claim 10, wherein the motor controller determines the statuses of the motor on whether the motor is overloaded, or has overcurrent and/or overvoltage.

12. The oil pumping apparatus of claim 7, further comprising,
   a display panel, the display panel including a upwards start button, a downwards start button, and a stop button,
   wherein the upwards start button moves the connector up, the downwards start button moves the connector down, and the stop button stops the oil pumping apparatus.

13. The oil pumping apparatus of claim 7, wherein the text display provides a frequency of the motor, a rotation speed of the motor, and an upper and a lower thresholds of movement distances of the load belt to the PLC.

14. The oil pumping apparatus of claim 1, wherein the connector is connected with an oil device to pump oil from an oil well.

15. The oil pumping apparatus of claim 1, further comprising,
   a platform for operation and maintenance of the oil pumping apparatus.

16. The oil pumping apparatus of claim 1, wherein the motor has a motor guide rail to adjust relative locations between the third roller and the motor horizontally and vertically.

17. The oil pumping apparatus of claim 1, wherein the hanging frame is a single piece.

18. An oil pumping apparatus comprising:
   a connector;
   a first roller mounted on a first frame having a first axle, the first roller being rotatable about the first axle;
   a load belt moveable over the first roller, the load belt having one end connected to the connector, and having another end connected with a hanging frame;
   a second roller being mounted with the hanging frame, and being rotatable about a second axle;
   a third roller being mounted on the first frame, and being rotatable about a third axle;
   a driven belt being moveable over the second roller, the driven belt being fixed at one end, and having another end connected with the third roller;
   a control system for the apparatus;
   a motor, wherein when the motor rotates in a first direction, the motor drives the third roller to collect the driven belt, and wherein when the motor rotates in a second direction, the motor drives the third roller to release the driven belt from the third roller, and a count sensor and a plurality of measurement blocks,
   wherein the count sensor sends a signal to a programmable logic controller when one of the plurality of measurement blocks passes by the count sensor.

19. An oil pumping apparatus comprising:
   a connector;
   a first roller mounted on a first frame having a first axle, the first roller being rotatable about the first axle;
   a load belt moveable over the first roller, the load belt having one end connected to the connector, and having another end connected with a hanging frame;
   a second roller being mounted with the hanging frame, and being rotatable about a second axle;
   a third roller being mounted on the first frame, and being rotatable about a third axle;
   a driven belt being moveable over the second roller, the driven belt being fixed at one end, and having another end connected with the third roller;

a control system for the apparatus;

a motor, wherein when the motor rotates in a first direction, the motor drives the third roller to collect the driven belt, and wherein when the motor rotates in a second direction, the motor drives the third roller to release the driven belt from the third roller; and a reference soft iron and a reference position switch, the reference soft iron being installed inside the load belt, wherein when the reference soft iron is in a closest position to the reference position switch, the reference position switch sets the closest position as a reference position and sends a signal to a programmable logic controller.

\* \* \* \* \*